No. 766,377.

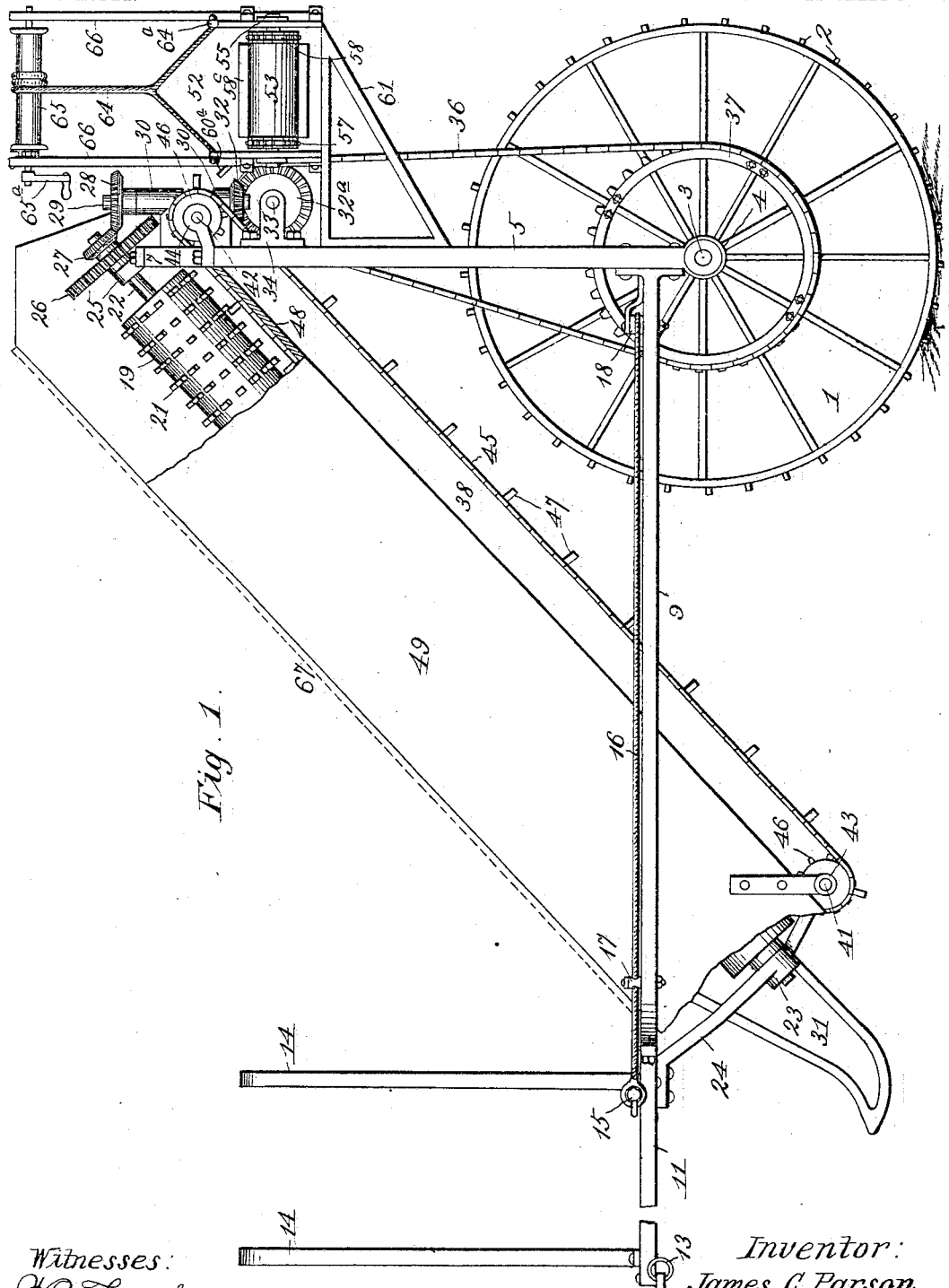

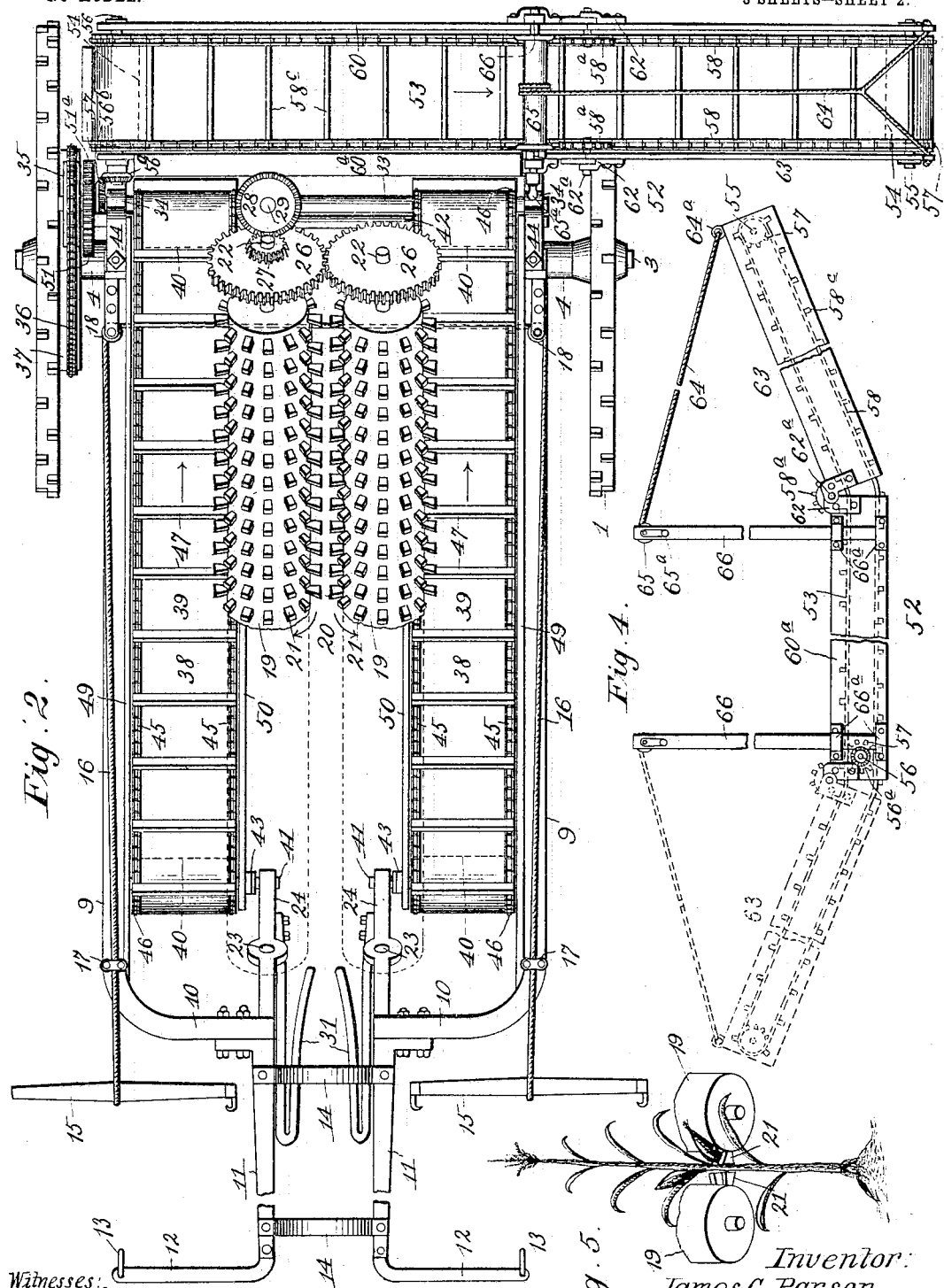

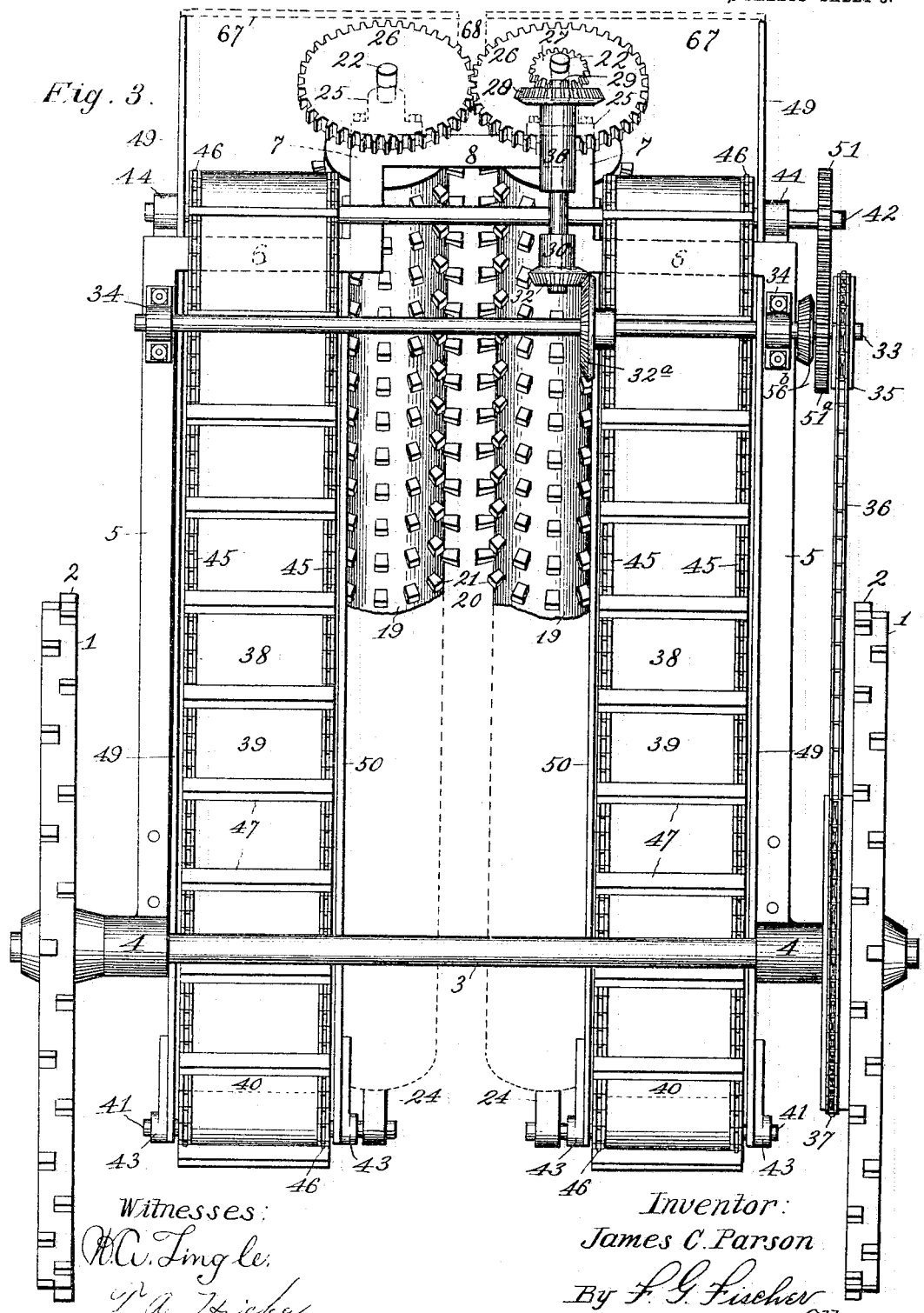

Patented August 2, 1904.

UNITED STATES PATENT OFFICE.

JAMES C. PARSON, OF OAKGROVE, MISSOURI.

CORN-SNAPPING MACHINE.

SPECIFICATION forming part of Letters Patent No. 766,377, dated August 2, 1904.

Application filed July 29, 1903. Serial No. 167,495. (No model.)

*To all whom it may concern:*

Be it known that I, JAMES C. PARSON, a citizen of the United States, residing at Oakgrove, in the county of Jackson and State of Missouri, have invented certain new and useful Improvements in Corn-Snapping Machines, of which the following is a specification.

My invention relates to improvements in corn-snapping machines; and my object is to produce a machine of this character which will automatically snap the ears of corn from the stalks without uprooting the latter from the ground and elevate them into a wagon hauled beside the machine or discharge them into a receptacle attached to the machine.

The essential features of the invention reside in a pair of rotary cylinders placed side by side at a suitable inclination and armed with teeth which snap the ears of corn from the stalks.

Other features of the invention consist in gathering-arms for directing the stalks between the cylinders, in elevators for receiving the corn from the cylinders for the purpose of raising it to the upper portion of the machine, and a conveyer to receive the corn from the elevators for the purpose of discharging it into a vehicle hauled beside the machine.

In order that the invention may be fully understood, reference will now be made to the accompanying drawings, in which—

Figure 1 represents a broken side elevation of the machine with the near wheel removed. Fig. 2 is a plan view of the same, partly broken away. Fig. 3 is a rear elevation with parts of the machine removed. Fig. 4 is a detail side elevation of the conveyer employed to conduct the ears of corn from the machine to the wagon hauled beside the latter. Fig. 5 is a broken detail of the cylinders, showing the teeth thereon engaging an ear of corn preparatory to snapping it from the stalk.

In carrying out my invention I mount the machine upon a pair of carrying-wheels 1, armed with shoes 2 to prevent them from slipping while driving the elevators and other working parts of the machine. The hubs of said wheels are provided with ordinary clutch members (not shown) adapted to engage companion clutch members secured to the opposite ends of an axle 3 for the purpose of rotating the latter when the wheels move forward and to permit independent movement of the wheels when turning the machine. Axle 3 is journaled in bearings 4, secured to the lower ends of standards 5, provided at their upper ends with inwardly-extending arms 7, suitably secured at their inner ends to upwardly-extending arms 6, which are united at their upper ends by a cross-brace 8.

9 designates a pair of horizontal bars secured at their rear ends to standards 5 and bent toward each other at their forward ends 10, which terminate a suitable distance apart and are provided with forwardly-extending draft-poles 11, having outwardly-turned arms 12, with rings 13 for attaching the breast-straps of the harness. Draft-poles 11 are braced near their opposite ends by yokes 14, that extend upwardly a sufficient height to clear the cornstalks, upon the opposite sides of which latter the draft-poles are adapted to pass.

15 designates a pair of singletrees secured to the forward ends of a draft-equalizer consisting of a cable 16, operating around sheave-wheels 17 18, secured to horizontal bars 9, sheaves 18 being secured near the rear ends of said bars, so that the transverse portion of cable 16 will not bend or break the stalks until the ears of corn have been removed therefrom.

19 designates a pair of cylinders arranged side by side, with an interposing space 20 and armed with teeth 21, adapted to engage the ears of corn and pull them from the stalks. Cylinders 19 are rigidly mounted upon shafts 22, journaled at their lower ends in bearings 23 on brackets 24, secured to the under side of the draft-poles and journaled at their upper ends in bearings 25, secured upon arms 6. The upper ends of the shafts are provided with rigidly-mounted intermeshing cog-wheels 26, and one of said upper ends is also provided with a small bevel-gear 27, that meshes with a larger bevel-gear 28, rigidly mounted upon the upper end of a short vertical shaft 29, journaled in bearings 30, secured to one of arms 7.

31 designates a pair of gathering-arms which are secured to brackets 24 and extend forwardly and downwardly to engage bent or broken stalks that are raised upwardly by the recurved converging upper portions of the gathering-arms and directed into space 20 between the cylinders. As the free ends of the gathering-arms stand at the mouth of space 20, the stalks are guided between the cylinders and there is no danger of their being broken by contact with the front ends of said cylinders.

Shaft 29 is provided at its lower end with a small rigidly-mounted bevel-gear 32, that meshes with a larger bevel-gear $32^a$, rigidly mounted upon a transverse shaft 33, journaled in bearings 34, secured to the rear side of standards 5.

Shaft 33 is provided at one end with a rigidly-mounted sprocket-wheel 35, driven by an endless sprocket-chain 36, operating over sprocket-rim 37, secured to the spokes of the carrying-wheels.

As the ears of corn are snapped from the stalks by the cylinder-teeth 21 they are tossed upon two elevators 38, disposed at the outer sides of and partly underlying the cylinders and consisting of endless belts 39, operating over rollers 40, rigidly mounted upon transverse shafts 41 42, journaled in bearings 43 44, respectively. Belts 39 are prevented from slipping on rollers 40 by sprocket-chains 45, secured to their opposite edges and operating over sprocket-wheels 46, rigidly mounted upon shafts 41 42, respectively. Shafts 41 are journaled in the lower ends of brackets 24 and the lower corners of side-boards 49, thus bracing brackets 24 against the downward strain of the rotating cylinders. I consider it very advantageous to secure the cylinders, elevators, and gathering-arms to brackets 24, as this common point of attachment insures the operative relation of these parts.

Sprocket-chains 45 are connected in pairs by transverse cleats 47, which engage the ears of corn and carry them with the aid of belts 39 to the top of the elevators. The upper strands of belts 39 are prevented from sagging beneath the weight of the corn by inclined bottom portions 48, which terminate near rollers 40 and are secured to the lower edges of inclined side-boards 49 50, respectively, provided to guard the ears of corn from rolling off the sides of the belts. Side-boards 49, which are higher than side-boards 50, are secured at their lower and upper ends to bars 9 and standards 5, respectively, and are provided near their lower ends with the outer set of bearings 43, above mentioned, the inner set of said bearings being arranged in the lower ends of brackets 24 and bearings 43.

Shaft 42, which extends across the rear upper portion of the machine, is provided near one end with a rigidly-mounted cog-wheel 51, that meshes with and is driven by a similar cog-wheel $51^a$, rigidly mounted upon shaft 33.

As the ears of corn are discharged from the upper ends of elevators 38 they fall upon a transverse conveyer 52, that extends outwardly to one side of the machine a sufficient distance to deliver the corn into a vehicle hauled beside the machine. Said conveyer consists of an endless belt 53, operating over rollers 54, rigidly mounted upon shafts 55 56, provided with rigidly-mounted sprocket-wheels 57, over which operate endless sprocket-chains 58, secured to the opposite sides of belt 53 to prevent the latter from slipping backward on the rollers and are connected by transverse cleats $58^c$.

Shaft 56 is provided at its inner end with a small rigidly-mounted bevel-gear $56^a$, that meshes with and is driven by a larger bevel-gear $56^b$, rigidly mounted upon shaft 33.

The ears of corn are prevented from falling off the sides of the belt by stationary side-boards 60 $60^a$, carried by brackets 61, secured to the rear sides of standards 5, the inner board $60^a$ being set at an angle in order to catch the corn as it is delivered from the elevators and prevent it from falling between said elevators and the conveyer.

63 designates an adjustable extension hinged at 62 to the stationary side-boards, so it may be raised high enough to deliver the corn over the side-board of an ordinary farm-wagon. The adjustment of extension 63 is controlled by cable 64, secured at its opposite ends to eyes $64^a$, attached to the outer end of the extension, and a windlass 65, operated by a crank $65^a$ and journaled in standards 66, removably secured in sockets $66^a$ on the stationary side-boards, so they may be taken off when not in use.

The upper strands of sprocket-chains 58 are retained in position at the hinged portion of the conveyer by idlers $58^a$, journaled upon the inwardly-extending ends of the hinge-pivots $62^a$. As illustrated in Fig. 4, I may combine with idler $58^a$ a second roller operating upon the lower half of the conveyer and journaled in the ends of the side-board. This second roller may be a driving-roller 56 or another idler. When not in use, the hinged extension 63 is folded back upon the stationary side-boards, so that it will not prove an obstruction to the vehicle in passing to and from the field or through a gate.

In operation the carrying-wheels travel on each side of the row of corn, and the gathering-arms direct the broken and leaning stalks to the space between the cylinder-teeth, which is just wide enough to admit the stalks, but not the ears of corn. Consequently when the swiftly-moving teeth contact with the latter they are snapped from the stalks and tossed upon the elevators. Should it be found by practice that some of the ears of corn will be thrown over the sides of the elevators, the latter, together with the tops of the cylinders, may be inclosed by a covering 67, (shown by dotted lines in Figs. 1 to 3,) having a central opening 68 to clear the stalks. The elevators carry the ears of corn to the upper rear end of the machine, where they may be discharged into a receptacle secured to the machine or into conveyer 52, and when the latter is used it may be, if desired, provided with two adjustable extensions, as shown by full and dotted lines in Fig. 4, so that after the machine has passed down one row of corn it may be turned around to operate on the next row instead of passing over to the row at the opposite side of the field. When the two extensions are employed, any ordinary reversing-gear is used for changing the movement of belt 53, so it can be made to travel in the direction of either extension.

By thus providing a machine that will gather the ears of corn from the stalks it is obvious that much time and labor will be saved over the present system of performing this work by hand, and while I have described a specific construction for performing the work I of course reserve the right to make such changes in said construction as properly fall within the scope of the appended claims.

Having thus described my invention, what I claim, and desire to secure by Letters Patent, is—

1. In a machine of the character described, the combination with a mounted frame, of a pair of brackets projecting rearwardly and downwardly from the forward portion of said frame, a pair of rotary cylinders arranged substantially perpendicular to said brackets and journaled at their lower ends therein, transverse shafts connecting the lower ends of the brackets with the frame, rollers mounted thereon, and endless elevators adjacent the cylinders and carried on said rollers.

2. In a machine of the character described, the combination with a mounted frame, of a pair of brackets projecting rearwardly and downwardly from the forward portion of said frame, a pair of rotary cylinders arranged substantially perpendicular to said brackets and journaled at their lower ends therein, transverse shafts connecting the lower ends of the brackets with the frame, rollers mounted thereon, and endless elevators adjacent the cylinders and carried on said rollers.

3. In a machine of the character described, the combination with a mounted frame, of a pair of brackets projecting rearwardly and downwardly from the forward portion thereof, a pair of rotary cylinders arranged substantially perpendicular to said brackets and journaled at their lower ends therein, gathering-arms having forwardly-projecting portions secured to said brackets and recurved portions provided with free inner ends standing above the mouth of the intervening space between the cylinders, transverse shafts connecting the lower ends of the brackets with the frame, and endless elevators adjacent the cylinders and mounted on said shafts.

In testimony whereof I affix my signature in the presence of two witnesses.

JAMES C. PARSON.

Witnesses:
S. J. PARSON,
W. E. COZBY.